United States Patent [19]
Chu et al.

[11] 3,907,607
[45] Sept. 23, 1975

[54] CONTINUOUS PROCESSING OF RIBBON MATERIAL

[75] Inventors: Bing C. Chu, Raleigh, N.C.; David J. Fischer, Corning, N.Y.; Hans J. Kunz, Raleigh, N.C.

[73] Assignee: Corning Glass Works, Corning, N.Y.

[22] Filed: May 18, 1972

[21] Appl. No.: 254,610

Related U.S. Application Data

[62] Division of Ser. No. 841,409, July 14, 1969, Pat. No. 3,711,073.

[52] U.S. Cl. .............. 148/1.5; 148/186; 148/188; 148/189; 148/174; 117/107.1; 117/201; 118/48; 29/574; 156/17
[51] Int. Cl. .......................................... H01l 7/44
[58] Field of Search ............ 148/1.5, 174, 1.6, 175, 148/188, 187, 189, 186; 23/301 SP; 117/107.1, 201; 118/48–49.5; 29/574

[56] References Cited
UNITED STATES PATENTS

| | | | |
|---|---|---|---|
| 3,341,376 | 9/1967 | Spenke et al. .................. | 148/1.6 X |
| 3,349,474 | 10/1967 | Rauscher ....................... | 148/189 X |
| 3,397,672 | 8/1968 | Dykeman et al................. | 118/8 X |
| 3,441,454 | 4/1969 | Shaikh .............................. | 148/188 |
| 3,471,321 | 10/1969 | Oualline et al. ............. | 117/107.1 X |
| 3,615,944 | 10/1971 | Sheng et al. ........................ | 148/189 |

*Primary Examiner*—G. Ozaki
*Attorney, Agent, or Firm*—William J. Simmons, Jr.; Walter S. Zebrowski; Clarence R. Patty, Jr.

[57] ABSTRACT

A method for continuously processing elongated ribbons or webs of materials such as semiconductors, metals or glasses. Both ends of a tubular reaction chamber disposed in a heating system are provided with end caps which accommodate all gas inlet and outlet connections and which act as gas locks. A mixture of reactant and carrier gas enters the furnace through one end cap and leaves the furnace through the other. This furnace may be used for such chemical processes as diffusion, surface oxidation, etching, metallization and other pyrolytic processes.

2 Claims, 16 Drawing Figures

CONTINUOUS PROCESSING OF RIBBON MATERIAL

This is a division of application Ser. No. 841,409, filed July 14, 1969, now U.S. Pat. No. 3,711,073.

BACKGROUND OF THE INVENTION

Heretofore, the processing of semiconductor materials has usually been carried out by batch processes. For example, the doping of semiconductors by diffusion to change their electrical characteristics is conventionally performed as follows. Semiconductor wafers, which are loaded on a carrier, usually a quartz boat, are pushed into a tube containing a dopant carrier gas in a high temperature controlled furnace. After the elapse of a specified time, these wafers are removed. Temperature variations along the tube and errors in timing and flowmeter settings are inherent limitations in obtaining greater reproducibility than that which is usually achieved. Another problem is that doping usually takes place under transient temperature conditions since the cold boat has to be heated. In the process of heating the boat, the temperature profile of the furnace changes. Similar problems are encountered in other batch type processes.

Some of the disadvantages discussed above were alleviated by continuously moving the boats containing the semiconductor wafers through a furnace. Each boat was equipped with two end fixtures which formed a close fit with the furnace walls and thereby formed separate chambers which were continuously moved through the furnace at speeds varying from a fraction of an inch to a few feet per minute. The boats, upon which were placed semiconductor wafers, were first heated in an inert atmosphere, then subjected to a dopant gas mixture and thereafter moved to a cooling zone having an inert atmosphere. In spite of the advantages of this type of furnace, it was impractical because of the difficulty incurred in obtaining adequate materials for the furnace tube and the boats.

Commonly used high purity quartz is unsuitable because it deforms at high temperatures (1000° C. – 1200° C.) resulting in jamming between the tube and the boats. Moreover, when quartz is used, the excessive friction between stationary and moving parts prevents smooth passage of the boats through the tube. The use of high purity alumina is undesirable because of its high sensitivity to thermal shock which causes the boats to break when they are pushed through the furnace at a fast rate. Furnace tubes are further weakened by the attachment of gas inlet and exhaust connections to the central portion thereof. When alumina tubes were used, cracks usually started at the periphery of the holes provided for these connections. When sufficient clearance was allowed between the boat and the furnace tube to permit the boat to slide easily through the furnace, an excessive amount of gas leakage occurred.

SUMMARY OF THE INVENTION

An object of this invention is to provide a furnace which overcomes the above-noted disadvantages of the prior art.

Another object of this invention is to provide a furnace for continuously processing materials in the form of thin, flat ribbons and wafers which can be mounted on a moving belt.

Still another object of this invention is to provide a furnace for gaseous continuous processing of semiconductor and other materials with a minimum of contamination. This advantage is especially evident for a furnace utilizing inductive heating.

A further object of this invention is to provide a process for uniformly treating material. One special aspect of this invention is to provide an improved process for treating semiconductor materials.

The above objects are obtained by utilizing a furnace comprising an elongated tubular reaction chamber having first and second opposed ends to which first and second end caps are affixed. Each of the end caps have an opening therein communicating with the exterior of the furnace through which material to be processed continually passes. The first end cap includes inlet means adjacent the reaction chamber for receiving a reactant gas and introducing the same into the reaction chamber. Means are disposed adjacent the inlet means for preventing the exhausting of reactant gas through the opening in the first end cap. The second end cap includes exhaust means disposed adjacent the reaction chamber for exhausting the reactant gas therefrom. Means are disposed within the second end cap for preventing the exhausting of the reactant gas through the opening therein. In a modification of the basic furnace, one of the end caps is provided with means for preheating the material before it enters the reaction chamber.

In accordance with the present invention all of the gas inlet and outlet connections are located on the end caps of the furnace. This arrangement simplifies furnace tube design and permits the use of materials which could not otherwise be used. The use of inert gas in gas locks located between the reactant gas inlet chamber and the slot through which passes the moving ribbon of material to be processed prevents the escape of reactant gases into the atmosphere and prevents contamination by ambient air which could penetrate into the reaction chamber in the absence of such gas locks. The design of the end caps of this furnace permits the use of sufficient clearance between the moving web and the stationary furnace parts to avert jamming.

Utilization of this novel furnace for continuous chemical processing of semiconductor and other materials results in optimum control of operating conditions, simplification of the tube design, and minimization of the ambient contamination.

DETAILED DESCRIPTION

Figure 1:
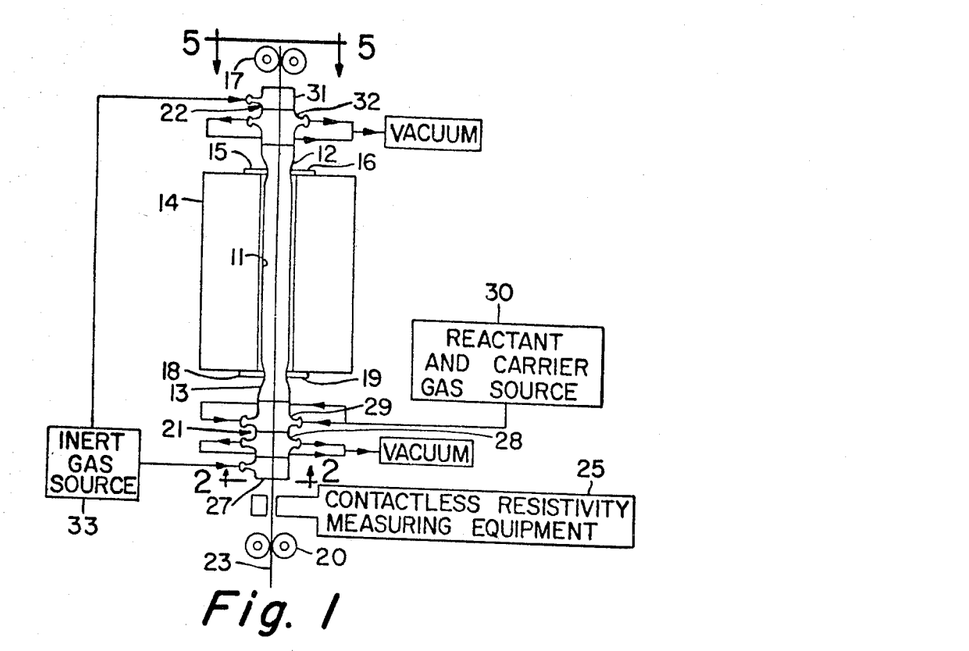
FIG. 1 is a schematic drawing of a preferred embodiment of the present invention including a block diagram representation of associated apparatus.

FIG. 1 schematically illustrates a preferred embodiment of the present invention. A furnace tube 11, having constrictions 12 and 13 near the ends thereof, is located in the center of a furnace 14 which may be of the inductive, radiative or conductive type. The top portion of the tube 11 is concentrically supported within the furnace by two half rings 15 and 16 which surround the constriction 12 and are supported by the furnace. Two half rings 18 and 19 surround the constriction 13 and hold the lower part of the tube 11 concentrically within the opening of the furnace. Both sets of half rings may be bonded together in any suitable manner after they are positioned around their respective constrictions. The tube 11 is provided with lower and upper end caps 21 and 22, respectively, which contain the gas inlet and exhaust connections. Since no gas connections are made directly to the tube 11, it may be made from high purity quartz or other suitable high temperature material. A web or ribbon 23 of semiconductor material extends through the tube 11 and through slots in the ends of the caps 21 and 22.

The sheet resistivity of the semiconductor material may be determined by contactless resistivity measuring equipment 25, through which the material passes as it emerges from the lower end cap 21. Two pairs of rollers 17 and 20 guide the ribbon through the centers of the slots in the caps 21 and 22.

In the illustrated embodiment, wherein the resistivity measuring equipment 25 is located adjacent the end cap 21, the rollers 20 act as driving means for pulling the web through the furnace. The speed of the rollers may be controlled in accordance with a measured quantity, e.g., the resistivity or other parameter related to the rate of movement of the ribbon through the furnace.

Figure 2:
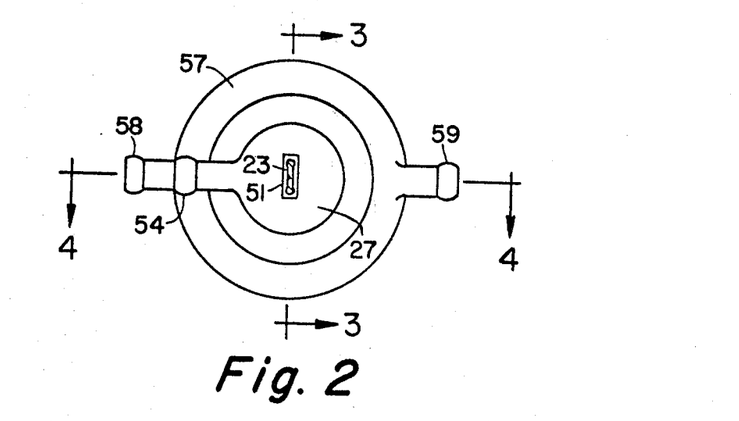
FIG. 2 is an enlarged bottom view taken at lines 2—2 of FIG. 1.
Figure 3:
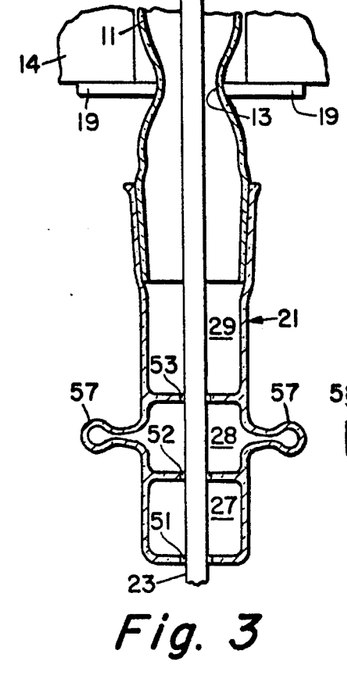
FIGS. 3 and 4 are cross-sectional views taken at lines 3—3 and lines 4—4, respectively, of FIG. 2.
Figure 4:
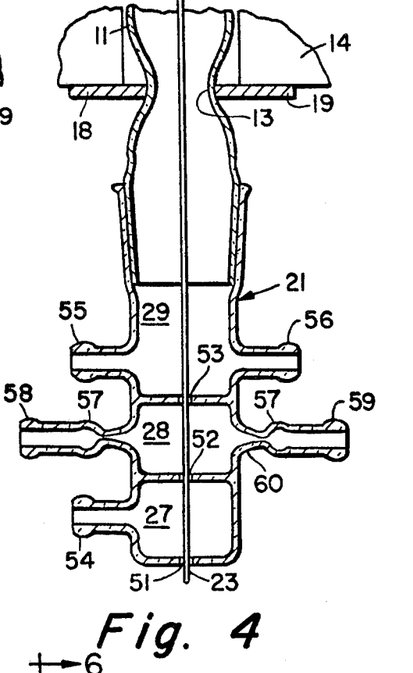

The lower end cap 21, which is shown in greater detail in FIGS. 2, 3 and 4 includes two gas inlet chambers 27 and 29 and an exhaust or evacuation chamber 28. The upper end cap 22, which is illustrated in greater detail in FIGS. 5, 6 and 7 includes a gas inlet chamber 31 and an exhaust or evacuation chamber 32. The chambers 27 and 31 of the end caps 21 and 22, respectively, each have a gas inlet connection to which a source 33 of inert gas such as nitrogen or argon is connected. The chambers 28 and 32 of the end caps 21 and 22, respectively, each have two gas exhaust connections which are connected to a vacuum system. The chamber 29 is provided with a pair of gas inlet connections which are connected to a source 30 of reactant and carrier gas.

Referring now to FIGS. 2, 3 and 4 the lower end cap 21 is shown in greater detail. The semiconductor ribbon 23 extends through a slot 51 in the bottom of the end cap 21 and through the slots 52 and 53 which interconnect the chambers 27 and 28 and the chambers 28 and 29, respectively. A gas inlet connector 54 is attached to the chamber 27. In order to supply a symmetrical flow of gas from source 30 to both sides of the ribbon 23, a pair of oppositely disposed inlet connectors 55 and 56 are attached to the chamber 29. A tapered wall portion 60 makes a continuous connection between the exhaust chamber 28 and a hollow annular tube 57 which surrounds that chamber. A pair of oppositely disposed exhaust connectors 58 and 59 are attached to the annular tube 57. This annular exhaust system provides efficient removal of gas from the exhaust chamber 28.

The flow of inert gas which enters the lower cap through connector 54 can be so adjusted that a desired quantity of gas will flow to the ambient through slot 51. After being processed, the web 23 will therefore be cooled prior to its emergence from the furnace. The remaining portion of the inert gas will enter the chamber 28 through the slot 52 and will be evacuated. The mixture of reactant and carrier gas, in most cases toxic, which escapes from the chamber 29 through the slot 53, can be effectively evacuated, thereby preventing contamination of the ambient.

Figure 5:
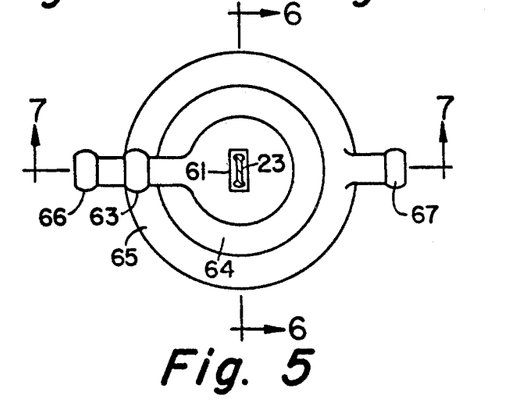
FIG. 5 is an enlarged top view taken at lines 5—5 of FIG. 1.
Figure 6:
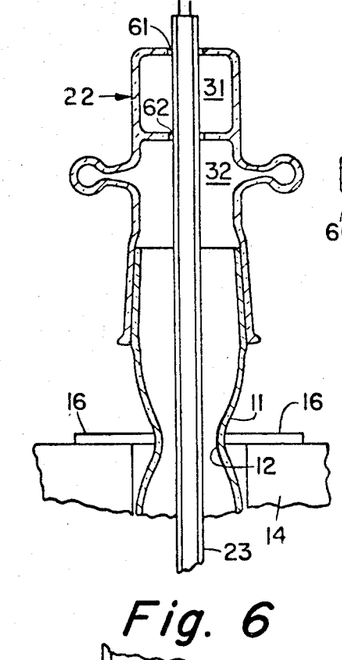
FIGS. 6 and 7 are cross-sectional views taken at lines 6—6 and lines 7—7, respectively, of FIG. 5.
Figure 7:
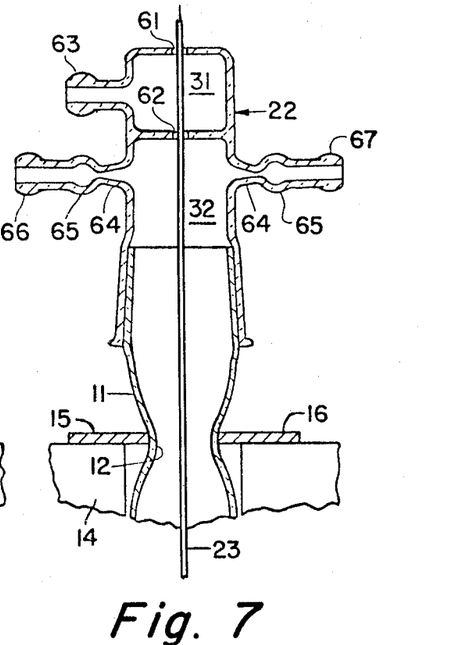

The upper end cap 22 is shown in greater detail in FIGS. 5, 6 and 7. The rollers 17 have been eliminated from these views for the sake of clarity. The semiconductor ribbon extends through a slot 61 in the end of the chamber 31. A gas inlet connector 63 is attached to this chamber for supplying an inert gas thereto. A slot 62 is disposed in the wall which is common to the chambers 31 and 32. A tapered wall portion 64 connects the exhaust chamber 32 to an annular tube 65 to which the opposed exhaust connectors 66 and 67 are attached. A portion of the inert gas that enters connector 63 will flow into chamber 32 through slot 62 and will be evacuated through the exhaust connectors 66 and 67, thereby preventing the flow of gases from the furnace to ambient through the slots 61 and 62. The remaining portion of the inert gas will flow through slot 61 to the ambient and thus prevent the entry of air into the furnace. The flow can be so adjusted that only a small quantity of the inert gas will escape through the slot 61.

Figure 8:
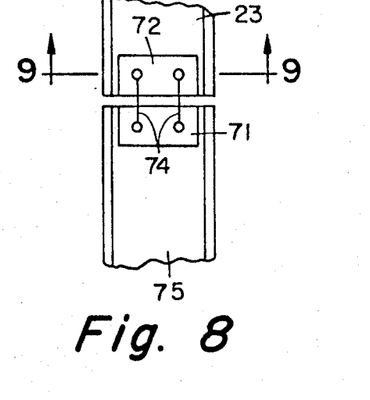
FIG. 8 illustrates an end portion of a semiconductor ribbon which may be processed in accordance with this invention and which has susceptor material attached thereto.

Prior to the start of the process, it is good practice to insert a piece of ribbon, cut approximately to the length of the furnace, through the furnace tube and its end caps. As illustrated in FIG. 8, a pair of inert and temperature resistant wires 74 is used to join the dummy ribbon 75 to the ribbon 23 which is to be processed. In this manner the material to be processed is better guided at the start. Two pairs of supporting plates 71 and 72 reinforce the ribbons in areas where the wires 74 are attached.

Figure 9:
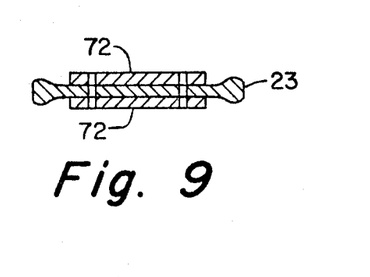
FIG. 9 is a cross-sectional view taken at lines 9—9 of FIG. 8, FIG. 9 being shown in a larger scale for the sake of clarity.

If an induction heating furnace is used to heat the semiconductor material within the furnace tube 11, a susceptor material is attached to the lower end of the semiconductor web 23 which initially passes through the furnace. As illustrated in FIGS. 8 and 9, such a susceptor may consist of the pair of non-corrosive conductive plates 72 which may be secured to the semiconductor web by the non-reactive and heat resistant supporting wires 74. These wires pass through holes which extend through the semiconductor web and the two susceptor plates. As previously stated, the plates 72 also have the function of reinforcing the ribbon. The susceptor plates may be omitted by utilizing a semiconductor web which is highly doped at one end. The conductivity of the highly doped end must be high enough to cause a high current density to be induced therein by the induction heater. Regardless of whether a highly doped region or susceptor plates are used to initiate the generation of heat at one end of the semiconductor web, the initially induced high temperature of this web will thereafter be sustained through induced current of sufficient density to maintain the desired operating temperature. After the semiconductor ribbon is initially heated, and the susceptor material passes from the furnace, there is no possibility of contamination of the semiconductor material from susceptor outgassing.

A platinum and platinum-rhodium thermocouple can be used as a temperature sensor when resistive or radiative heating is used. For inductive heat, an optical pyrometer may be used to detect the heat emission of the substrate, thereby providing electrical signals which can be utilized to regulate the power of an rf generator which supplies energy to the furnace, thus maintaining the temperature of the substrate at the desired level.

Although the above description specifically referred to the processing of a ribbon of semiconductor material, this furnace is not limited to such use; it is also suitable for the processing of metals, glasses and the like. The orientation of the furnace may be vertical, horizontal, or any position therebetween. In case of a horizontal arrangement, supports for the material to be processed might have to be used if mechanical tension cannot be applied to keep the material supported for optimum processing.

The above-described furnace can be used for such continuous chemical processes as diffusion, surface oxidation, etching, metallization and other pyrolytic processes. The specific examples described hereinbelow illustrate the versatility of the novel furnace of this invention, one of which requires modification of the basic furnace design.

DIFFUSION

In the diffusion process, chemical dopants are driven into a semiconductor ribbon by applying thereto sufficient thermal energies to change the electrical characteristics and/or the carrier type of the starting material. The ribbon may be of the type which is disclosed in U.S. Pat. No. 3,212,858 issued to W. J. Smith et al. on Oct. 19, 1965 or U.S. Pat. No. 3,293,002 issued to W. Spielmann et al. on Dec. 20, 1966. In this example gaseous phosphine, diluted in argon, is supplied to the furnace to cause phosphorous to diffuse into a silicon ribbon. The carrier gas is nitrogen mixed with a small amount of oxygen.

Figure 10:
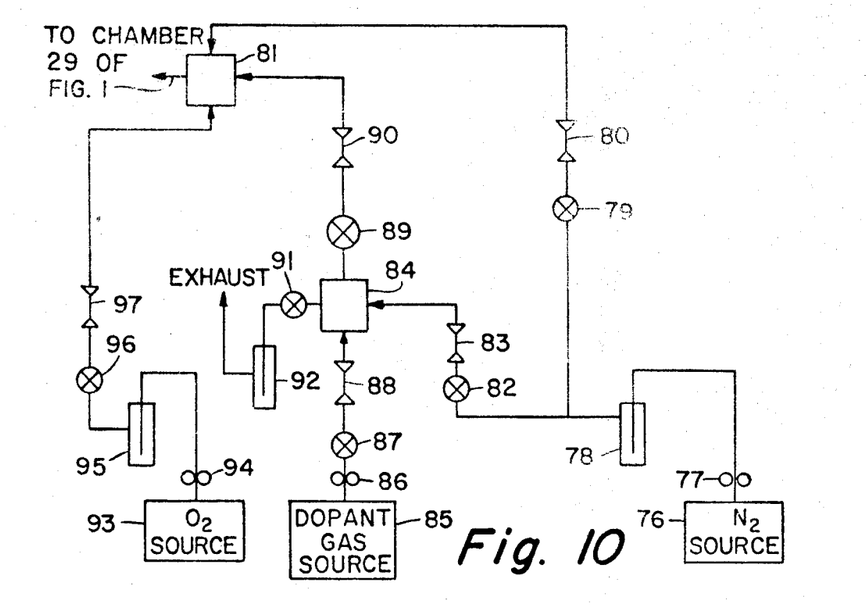
FIGS. 10, 11, 12, 15 and 16 show gas mixing systems for supplying the furnace of FIG. 1 with gases for the processes of diffusion, oxidation, metallization, glass deposition and vapor etching, respectively.

The gas mixing system for the diffusion process is schematically shown in FIG. 10. The nitrogen carrier gas is supplied by a high pressure tank or a liquid nitrogen source 76. The nitrogen passes through a regulator 77 where its pressure is reduced to 15 psig. The nitrogen then flows through a cold trap 78, which is cooled with liquid nitrogen to freeze out moisture. The nitrogen divides into two streams, the main stream flowing through stopcock 79 and flowmeter 80 into the mixing chamber 81. The second stream flows through stopcock 82 and flowmeter 83 into mixing chamber 84. Gaseous dopant phosphine ($PH_3$) in a tank 85 is premixed with argon in the ratio of 0.02% $PH_3$ and 99.98% Ar. In a regulator 86, the pressure of the phosphine argon mixture is reduced to 15 psig. The gas mixture then flows through a stopcock 87 and a flowmeter 88 into the mixing chamber 84. Gas from the chamber 84 flows through stopcock 89 and a flowmeter 90 into the mixing chamber 81.

In some situations the surface concentration of the diffused impurities in the silicon must be kept at a low level. In such cases the flow rates through the flowmeter 83 may be so low that its accuracy becomes questionable. A further dilution of the dopant gas therefore becomes necessary. The dopant gas flowing from the flowmeter 88 mixes in the chamber 84 with nitrogen flowing from the flowmeter 83 and part of the mixture flows through the stopcock 89 and the flowmeter 90 into the chamber 81. The remaining part of the gas mixture passes the stopcock 91 and bubbles through acidic CuCl solution in a flask 92 for eliminating the toxic component of the gas prior to its entry into the exhaust system. This step is absolutely necessary because of the extremely dangerous toxicity of $PH_3$. By carefully metering the gases through the flowmeters 83, 88 and 90, the desired concentration of the dopant can be easily obtained.

Since pure nitrogen has the tendency of attacking the silicon surface, about 3–5% of oxygen is added to the nitrogen to prevent pitting. The oxygen, which is supplied from a source 93, passes through a regulator 94 which reduces the pressure thereof to about 15 psig. The oxygen then passes through a cold trap 95, which is cooled with a mixture of dry ice and acetone, a stopcock 96, and a flowmeter 97 and into the chamber 81. From the outlet of the mixing chamber 81 the mixture of nitrogen, oxygen, argon and phosphine flows into the gas inlet chamber 29 of the furnace.

The process of diffusion is carried out in the following manner. With the stopcock 82 adjusted to prevent the flow of gas therethrough, the flow rates through the flowmeters 80 and 88 are adjusted to 4200 cc/min. and 300 cc/min., respectively. A p-type silicon web having a resistivity of approximately 14 ohm cm. is moved through the furnace at a rate of 7.5 mm/min. The furnace temperature is adjusted so that the temperature of the silicon web is about 1000°C. The rate of movement of the web through the furnace is such that each point thereon is subjected to the diffusion temperature for about 30 minutes. The resulting material emerging from the furnace is n-type and has a sheet resistivity of 71 ohms/square, the junction depth being 0.8 micron.

OXIDATION

In the oxidation process oxides are thermally grown on semiconductors to provide a protective layer or mask for the further steps necessary in the device fabrication sequence. In the following example, an oxide layer is grown on silicon semiconductor material in a wet oxygen atmosphere.

Figure 11:
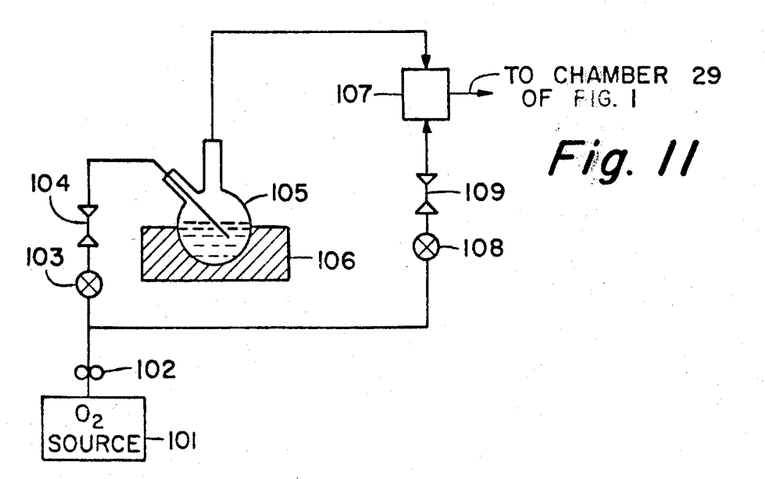

A schematic representation of the mixing system is shown in FIG. 11. Oxygen flows from a source 101 through a regulator 102 where the pressure of the gas is reduced to about 15 psig. The oxygen divides into two streams, one of which flows through a stopcock 103 and a flowmeter 104 and bubbles through a flask 105 which is filled with deionized water. A heater 106 keeps the water at the boiling point. The wet oxygen enters a mixing chamber 107 which is heated to prevent the condensation of water. The second oxygen stream bypasses the flask 105 and flows through a stopcock 108 and a flowmeter 109 into the mixing chamber 107. This arrangement permits the variation of the moisture content in the oxygen without changing the total flow in the furnace. The dry and wet oxygen mixes in the chamber 107 prior to its entry into the chamber 29 of the furnace.

In a specific example a web of n-type silicon having a resistivity of about 4.5 ohm cm. is moved through the furnace at a rate of about 3.75 mm/min. The furnace temperature is adjusted so that the temperature of the silicon is about 1100°C. Oxygen saturated with deionized water at the boiling point flows from the mixing chamber 107 at the rate of about 600 cc/min. At the indicated rate of web movement, each point on the web is subjected to the oxidation process for about 60 minutes. As a result an oxide thickness of about 0.6 micron is grown on the surface of the silicon web.

PYROLYTIC PROCESSES

Generally, organic compounds decompose into elements, oxides, or other compounds when heated to elevated temperatures. Utilizing this fact, metals, oxides, or dielectrics can be deposited on semiconductors, metals, glasses, or ceramics. Two of these pyrolytic processes, metallization and glass deposition, are described hereinbelow.

Some organo-metallic compounds will decompose at temperatures above their boiling point but well below the evaporation point of the elemental metal. Such a material may be vaporized and passed in controlled amounts over a substrate whose temperature equals or exceeds that required for decomposition of the compound. This reaction will free the elemental metal, which condenses on the substrate. The remaining organic products of reaction will be dispersed as elemental gas or vaporized compounds or condense according to their individual physical properties under the conditions of decomposition. This approach to the formation of metallic films may be used for the deposition of such materials such as aluminum, copper, nickel and tungsten.

Figure 12:
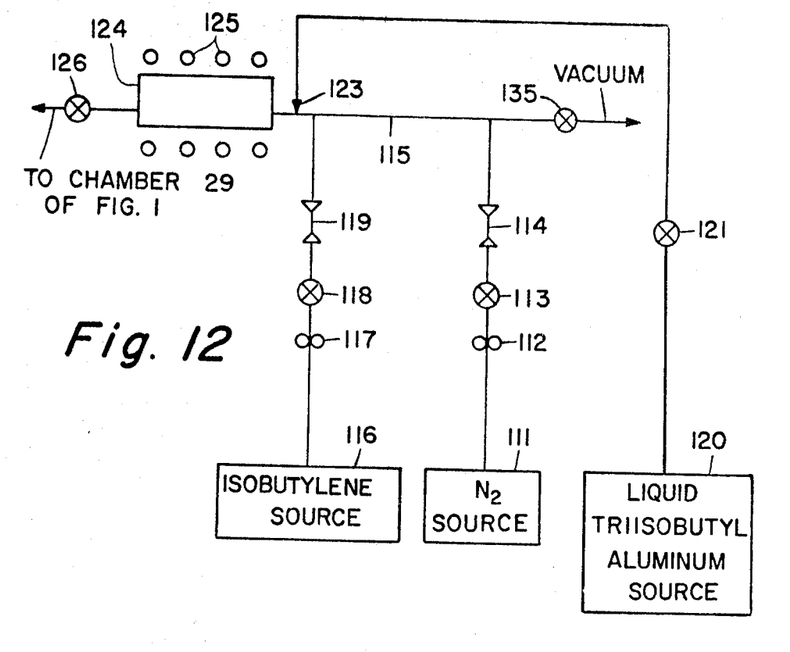
Figure 13:
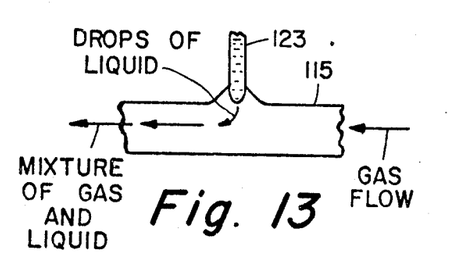
FIG. 13 is a detailed view of a dropper which is schematically illustrated in FIG. 12.

FIG. 12 schematically shows an arrangement for depositing aluminum films in this manner. Nitrogen flows from a source 111, through a regulator 112, a stopcock 113, and a flowmeter 114, into a line 115. Isobutylene from a source 116 flows through a regulator 117, stopcock 118 and flowmeter 119 to the line 115. Liquid triisobutyl aluminum supplied by a source 120, flows through a stopcock 121 and then drops slowly from a dropper 123 into the path of the gas stream consisting of nitrogen and isobutylene, which is flowing in the line 115. The detailed view in FIG. 13 illustrates operation of the dropper 123. The mixture thus obtained flows into a vaporizer 124 which is kept at a constant temperature of about 180°C. by a heating coil 125. The heated mixture then flows through a stopcock 126 and into the chamber 29 of FIG. 1. The nitrogen maintains the reactant mixture below 180°C. until it reaches the furnace isobutylene suppresses the reaction of changing triisobutyl aluminum into diisobutyl aluminum and isobutylene. A small portion of the mixture is evacuated ene. A small portion of the mixture is evacuated through the chamber 28 (FIG. 1) along with some inert gas, in this case nitrogen, which enters the end cap through the chamber 27. The main portion of the mixture passes over the silicon web 23 in the reaction chamber 11 and is exhausted through the end cap 22.

Figure 14:
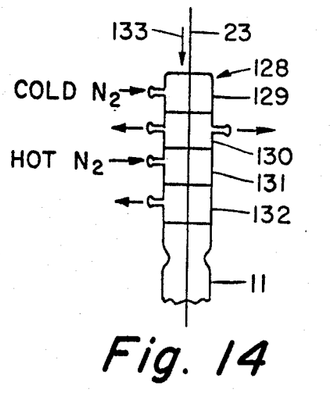
FIG. 14 is a schematic representation of a modified end cap which may be used in the process of metallization.

The process of metallization utilizes a modified end cap which is schematically illustrated in FIG. 14. The modified end cap 128 comprises two inlet chambers 129 and 131 and two outlet chambers 130 and 132.

The mixture of triisobutyl aluminum, nitrogen and isobutylene passes through the reaction chamber 11 and is exhausted from the chamber 132 along with some hot nitrogen which is supplied to the chamber 131. The web 23, which moves in the direction indicated by an arrow 133, is preheated by the hot nitrogen, the temperature of which is about 400°C. At the elevated temperature of the silicon web, the decomposition reaction will be initiated. The web will be coated with aluminum as it passes through the reactant gas atmosphere. In order to prevent the entry of hot nitrogen into the ambient, cold nitrogen is introduced into the chamber 129 and is exhausted along with the hot nitrogen through the chamber 130.

Since triisobutyl aluminum burns violently in the presence of oxygen, precautions must be taken at the beginning of the process. Prior to the introduction of triisobutyl aluminum, certain lines should be evacuated. This precautionary procedure is initiated by closing the stopcocks 121, 113, 118 and 126. A stopcock 135, which is connected to the line 115, is opened to vacuum. The stopcock 135 is then closed and nitrogen from the source 111 is introduced into the lines by opening the stopcock 113. When the pressure becomes equalized, stopcock 126 is opened to permit the reaction chamber 11 to be purged. Thereafter, the deposition can be started.

The silicon web can move in either direction through the furnace provided that the substrate is preheated prior to its entry into the furnace tube. The material upon which the reaction or deposition takes place could be in the form of a long sequence of conventional circular substrates supported on a moving belt instead of a ribbon. For an isobutylene flow rate of 1000 cc/min. and a nitrogen flow rate (from the source 111) of 3000 cc/min. the deposition rate is about 1000 A/sec.

Figure 15:
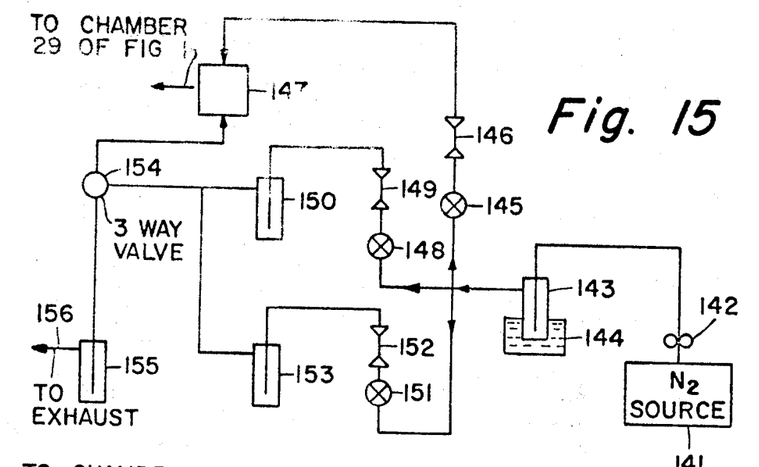

FIG. 15 is a schematic diagram of a mixing system for a pyrolytic process wherein an n-type doped oxide is deposited on a silicon web prior to a subsequent diffusion process. Nitrogen supplied by a source 141 at a rate of 1000 cc/min. passes through a regulator 142 where the pressure is reduced to about 15 psig. It then flows through a cold trap 143 which is disposed in a Dewar flask 144 containing a mixture of dry ice and acetone for freezing moisture out of the nitrogen. The nitrogen flow is then divided into three streams, the main stream flowing through a stopcock 145 and a flowmeter 146 into a mixing chamber 147. The second stream flows through a stopcock 148, a flowmeter 149 and a bubbler 150, which contains liquid tetraethylorthosilicate. The nitrogen becomes saturated with tetraethylorthosilicate vapor as it bubbles therethrough, flowing at a rate of 500 cc/min. The third stream of nitrogen passes through a stopcock 151 and a flowmeter 152 and becomes saturated with trimethylphosphate vapor as it bubbles through the latter at a rate of 300 cc/min. in liquid form in a bubbler 153. After flowing through the bubbler 153, this saturated nitrogen unites with the flow that comes from the bubbler 150. The gas mixture then flows through a 3-way valve 154 into the mixing chamber 147. The third branch of the 3-way valve 154 is connected to a bubbler 155 which contains water. This path is used to stabilize the flow of the gas mixture prior to the start of the process. After the chemicals are absorbed by the water in bubbler 155, the nitrogen flows through a line 156 to the exhaust system.

After passing mixing chamber 147, the gas mixture enters the reaction chamber in the reaction chamber 11 through the inlet chamber 29 of the end cap 21. The gas mixture decomposes in the reaction chamber of the furnace, the temperature of which is 700°C., and a layer of phosphorous silicate glass deposits onto the silicon web which is passing through the furnace tube at a rate of 11.5 mm/min. At this rate of movement, each point on the silicon web is subjected to the glass deposition process for about 20 minutes. After the deposition process is completed the phosphorous silicate glass may be selectively removed from areas where no doping is desired. The diffusion process can then be carried out in accordance with presently known technology.

VAPOR ETCH

In the etching process, material is removed from the surface of a substrate consisting of a material such as semiconductor, metal or glass through chemical reaction between the substrate and the etchant. The process is conventionally carried out by immersing the substrate in a liquid etchant or by passing the etchant in gaseous form over the material to be etched. In many aspects, the use of a vapor etchant is more advantageous. In the vapor etch process, the etchant passes over the surface of a substrate continuously and thus removes the heat and products yielded in the chemical reaction as it flows. These features are essential for good process control. However, these effects are not easily achieved in the wet etch process. In the vapor etch process, the chemical reaction ceases immediately when the substrate is removed from the reaction chamber while in the wet etch process either water or other chemicals have to be used to stop further reaction. The subsequent drying step after the removal of the etchant from the surface of the substrate increases the possibility of contamination.

Figure 16:
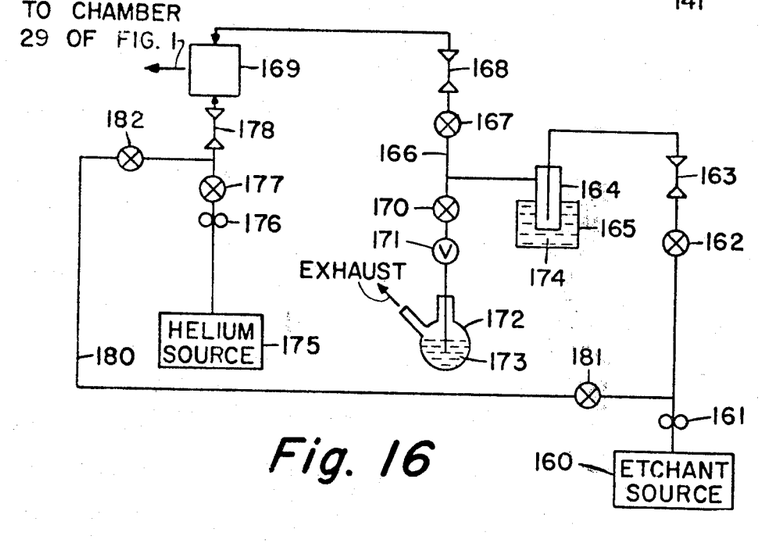

FIG. 16 schematically illustrates a gas mixing system which may be utilized to vapor etch a mesa pattern on a silicon web. A premixed etchant consisting of 99.0% chlorine and 1% anhydrous hydrogen chloride is supplied by a source 160. After the pressure of the etchant has been reduced to about 15 psig. by a regulator 161, the etchant flows through stopcock 162 and a flowmeter 163 into a cold trap 164 which is disposed in a Dewar flask 165 containing a mixture 174 of dry ice and acetone. In the cold trap the etchant will be liquefied and evaporated again. Thus, the etchant becomes purified and moisture-free prior to the use thereof.

Since the evaporation rate of liquid chlorine is temperature sensitive, the etchant flow rate tends to fluctuate. In order to minimize the variation of the amount of etchant that enters the reaction chamber, the etchant flow is divided into two streams after it passes through the cold trap 164. One stream with relatively low flow, about 150 cc/min., is allowed to enter the mixing chamber 169 through a line 166, a stopcock 167 and a flowmeter 168, while the remaining portion flows through a stopcock 170 and a check valve 171 into a flask 172 containing sodium hydroxide 173. The provision of this second path minimizes fluctuations in the rate of etchant flow through the line 166. The etchant is neutralized in the flask 172 prior to the entry thereof into the exhaust system. The provision of two flow paths after the cold trap 164 is also necessary for stabilizing the flow of the etchant at the start of the etching process. A carrier gas such as helium, supplied by a source 175, flows at the rate of 1,000 cc/min. through a stopcock 177 and a flowmeter 178, its pressure having been reduced to about 15 psig. by a regulator 176. The mixture of helium, chlorine and hydrogen chloride flows from the mixing chamber 169 into the furnace, the temperature of which is about 655°C.

In order to remove air from the mixing system and from the reaction chamber in the furnace tube 11 prior to the start of the etching process, a connection is made between the etchant flow path and the helium flow path. This same connection is also made to remove etchant from mixing system and the reaction chamber at the end of the process. This connection consists of a line 180 having stopcocks 181 and 182 at opposite ends thereof. These normally closed stopcocks are opened only during the purging periods.

Chlorine attacks silicon but not silicon dioxide, thus permitting the selective etching of silicon. Prior to the etching with chlorine vapor, a layer of protective oxide having a thickness of approximately 4,000A is grown over the whole surface of the silicon substrate. In those areas where etching should take place the oxide layer is removed in a photoresist process. After this preparation, the etching can proceed. Since silicon reacts with oxygen quickly, a thin layer of oxide will form even when the silicon is exposed to the air for a very short time. The anhydrous hydrogen chloride content in chlorine will remove this thin oxide so that the silicon will be exposed to chlorine for etching. The amount of hydrogen chloride is so small that only a very thin layer of the protective oxide will be removed. With the process conditions stated hereinabove the rate of etching of the silicon is about 3.8 microns per minute.

We claim:

1. The method of continuously processing ribbon-like material, comprising the steps of:
   passing said material through a first region containing an inert gas,
   passing said material through a first evacuation chamber,
   passing said material through a region containing hot inert gas at an elevated temperature, the transfer of heat from said hot inert gas to said material preheating said material,
   passing said material through a reaction chamber containing a reactant gas wherein said material is heated to a temperature sufficient to cause said reactant gas to react at the surface of said material,
   passing said material through a second evacuation chamber, and
   passing said material through a second region containing inert gas.

2. The method of continuously processing ribbon-like semiconductor material, comprising the steps of:
   passing said material through a first region containing an inert gas,
   passing said material through a first evacuation chamber,
   passing said material through a reaction chamber containing a mixture of dopant and inert carrier gases wherein said material is heated to a temperature sufficient to cause said dopant gas to react at the surface of said material and change the resistivity thereof, passing said material through a second evacuation chamber,
passing said material through a second region containing inert gas,
measuring the resistivity of said material after said material has passed through said second region, and
adjusting the rate of movement of said material in accordance with the measured resistivity of said material to control the period of time during which each unit length of said material is subjected to said dopant gas.

* * * * *